US012698366B2

(12) United States Patent
Blanford et al.

(10) Patent No.: US 12,698,366 B2
(45) Date of Patent: Aug. 4, 2026

(54) METHOD FOR PRODUCING A PLASTIC OBJECT WITH EMBEDDED QUATERNARY SALTS

(71) Applicant: Research Foundation of the City University of New York, New York, NY (US)

(72) Inventors: William J. Blanford, Flushing, NY (US); Gregory D. O'Mullan, Garden City, NY (US); Robert Engel, New York, NY (US)

(73) Assignee: Research Foundation of the City University of New York, New York, NY (US)

(*) Notice: Subject to any disclaimer, the term of this patent is extended or adjusted under 35 U.S.C. 154(b) by 287 days.

(21) Appl. No.: 18/437,913

(22) Filed: Feb. 9, 2024

(65) Prior Publication Data

US 2024/0287264 A1 Aug. 29, 2024

Related U.S. Application Data

(63) Continuation-in-part of application No. 17/419,084, filed as application No. PCT/US2019/068568 on Dec. 26, 2019, now Pat. No. 11,919,992.

(60) Provisional application No. 62/784,919, filed on Dec. 26, 2018.

(51) Int. Cl.

| | |
|---|---|
| ***C08J 3/21*** | (2006.01) |
| ***C08K 3/32*** | (2006.01) |
| ***C08K 5/19*** | (2006.01) |

(52) U.S. Cl.

CPC ................ *C08J 3/212* (2013.01); *C08K 3/32* (2013.01); *C08K 5/19* (2013.01); *C08J 2327/06* (2013.01)

(58) Field of Classification Search

CPC ...... C08F 8/26; C08F 8/32; C08F 8/44; C08F 114/06; C08F 214/06; C08F 14/06

See application file for complete search history.

(56) References Cited

U.S. PATENT DOCUMENTS 3,397,215 A 8/1968 Hettinger, Jr.
3,516,959 A * 6/1970 Moore ................ C08K 5/0066 501/148

(Continued)

FOREIGN PATENT DOCUMENTS

AU 2011318545 4/2012
CA 2481199 2/2013

(Continued)

OTHER PUBLICATIONS

Livi, Journal of Colloid and Interface Science 354 (2011) 555-562 (Year: 2011).*

(Continued)

*Primary Examiner* — Robert C Boyle

(74) *Attorney, Agent, or Firm* — Schmeiser Olsen PLLC; Peter J. Mikesell

(57) ABSTRACT

A method for producing customized object is provided. A resin (e.g. plastic or cellulose) is heated and a quaternary salt is added. The resulting admixture is used in forming a material that embodies customized characteristics. In another embodiment, a halogen-containing polymer has a quaternary molecule covalently bonded to it that results in customized properties.

20 Claims, 1 Drawing Sheet

(56) References Cited

U.S. PATENT DOCUMENTS

| | | | | |
|---|---|---|---|---|
| 3,917,469 | A * | 11/1975 | Cotter | C01B 17/60 95/137 |
| 5,855,784 | A * | 1/1999 | Pike | B01D 39/163 442/364 |
| 6,497,868 | B1 * | 12/2002 | Tanahashi | C08F 291/00 424/78.37 |
| 7,241,453 | B2 | 7/2007 | Engel et al. | |
| 7,285,286 | B2 | 10/2007 | Engel et al. | |
| 8,329,155 | B2 | 12/2012 | Cloninger et al. | |
| 8,999,316 | B2 | 4/2015 | Engel et al. | |
| 2009/0233935 | A1 * | 9/2009 | Engel | A01N 25/10 514/249 |
| 2011/0233810 | A1 | 9/2011 | Neigel et al. | |
| 2012/0322910 | A1 * | 12/2012 | Chatterjee | C08L 93/04 522/126 |
| 2016/0215120 | A1 * | 7/2016 | Henry | C08F 14/22 |
| 2017/0007464 | A1 * | 1/2017 | Liu | C09J 9/00 |

FOREIGN PATENT DOCUMENTS

| | | | | |
|---|---|---|---|---|
| EP | 0018823 B1 * | 7/1984 | | F28D 9/0056 |
| WO | WO2011038897 | 4/2011 | | |

OTHER PUBLICATIONS

Dai, Lei, et al.; 3D printing using plant-derived cellulose and its derivatives: A review, Carbohydrate Polymers 203 (2019) 71-86; Published online Sep. 19, 2018.

Chinga-Carrasco, Gary; Potential and Limitations of Nanocelluloses as Components in Biocomposite Inks for Three-Dimensional Bioprinting and for Biomedical Devices; Biomacromolecules 2018, 19, 701-711; Feb. 28, 2018.

Xu, Wenyang et al.; Three-Dimensional Printing of Wood-Derived Biopolymers: A Review Focused on Biomedical Applications; ACS Sustainable Chem. Eng. 2018, 6, 5663-5680; Mar. 27, 2018.

Eldin M.S. Mohy et al.; Covalent Immobilization of b-Galactosidase onto Amino-Functionalized PVC Microspheres; Journal of Applied Polymer Science, vol. 125, 1724-1735 (2012), Jan. 17, 2012.

ISA/US; International Search Report in Corresponding International Application PCT/US2019/068568 issued on Apr. 28, 2020.

Sneddon, Gregor et al.; Aminated poly(vinyl chloride) solid state adsorbents with hydrophobic function for post-combustion CO2 capture; J. Mater. Chem. A, 2017, 5, 11864; Apr. 26, 2017.

Kim, Jung Hwan et al.; DEHP Migration Behavior from Excessively Plasticized PVC Sheets; Bull. Korean Chem. Soc. 2003, vol. 24, No. 3, Mar. 20, 2003.

Suresh P S et al; DEHP Migration Behavior from Excessively Plasticized PVC Sheets; Indian Journal of Chemistry, vol. 40A, Sep. 2001, pp. 943-946.

Alenazi Noof A.; et al.; Modified polyether-sulfone membrane: a mini review; Designed Monomers and Polymers, 2017 vol. 20, No. 1, 532-546; Nov. 2, 2017.

Ameer, A. Ameer et al.; Synthesis and Characterization of Polyvinyl Chloride Chemically Modified by Amines; Open Journal of Polymer Chemistry, 2013, 3, 11-15; Feb. 2013.

Asadinezhad Ahmad et al.; Recent Progress in Surface Modification of Polyvinyl Chloride; Materials 2012, 5, 2937-2959; Dec. 18, 2012.

Hopkins Sean P. et al.; S-Nitroso-N-Acetyl-D-Penicillamine Modified Hyperbranched Polyamidoamine for High-Capacity Nitric Oxide Storage and Release; Bioengineering 2020, 7, 9;Jan. 10, 2020.

Bowley H.J. et al; The Effect of Amines on the Dehydrochlorination of Poly(Vinyl Chloride); Journal of Vinyl Technology, Mar. 1988, vol. 10. No. 1.

Chai, R.D.; Combined effect of hindered amine light stabilizer and antioxidants on photodegradation of poly (vinyl chloride); Journal of Thermoplastic Composite Materials 25(7) 879-894; Oct. 18, 2011.

Ferruti P. et al.; Heparinizable materials (III). Heparin retention power of a poly(amindo-amine) either as crosslinked resin, or surface-grafted on PVC; Biomaterials 1984, vol. 5, Jul. 1984.

Ferruti P. et al.; Preparation and ESCA characterization of poly(vinyl chloride) surface-grafted with heparin-complexing poly(amido amine) chains; Biomaterials 1982, vol. 3, Jan. 1982.

McGinty Kathryn M. et al.; Hydrophilic surface modification of poly(vinyl chloride) film and tubing using physisorbed free radical grafting technique; Polymer 49 (2008) 4350-4357; Aug. 9, 2008.

Park Eun Ji, et al.; Elimination and Substitution Compete During Amination of Poly(vinyl chloride) with Ehtylenediamine: XPS Analysis and Approach of Active Site Index; Macromol. Res., 26(10), 913-923 (2018); Jun. 18, 2018.

Rodrigues Jeronimo de Andrade et al.; Derivatization of Polyvinylidene Difluoride Membranes for the Solid-Phase Sequence Analysis of a Phosphorylated Sea Urchin Embryo Histone H1 Peptide; Analytical Biochemistry 216, 365-372 (1994) ; Feb. 1, 1994.

Sun, Miao et al.; Synthesis and characterization of hyperbranched poly(ester-amine) by Michael addition polymerization; Designed Monomers and Polymers, 2017; vol. 20, No. 1, 458-467; Jul. 13, 2017.

Singh Ajay, et al.; Chemical Modification and Characterization of Poly(vinyl chloride) by Crosslinking of Multifunctional Amines; Journal of Applied Polymer Science, vol. 118, 876-880 (2010); May 26, 2010.

Moulay S.; Chemical modification of poly(vinyl chloride)—Still on the run; Progress in Polymer Science 35 (2010) 303-331, Dec. 16, 2009.

Huang, X.; Nanopalladium immobilized on aminoethanol-functionalized poly(vinyl chloride): an easily prepared, air and moisture stable catalyst for Heck reactions; Monatsh Chem; Jul. 9, 2008; pp. 1447-1451; vol. 139.

* cited by examiner

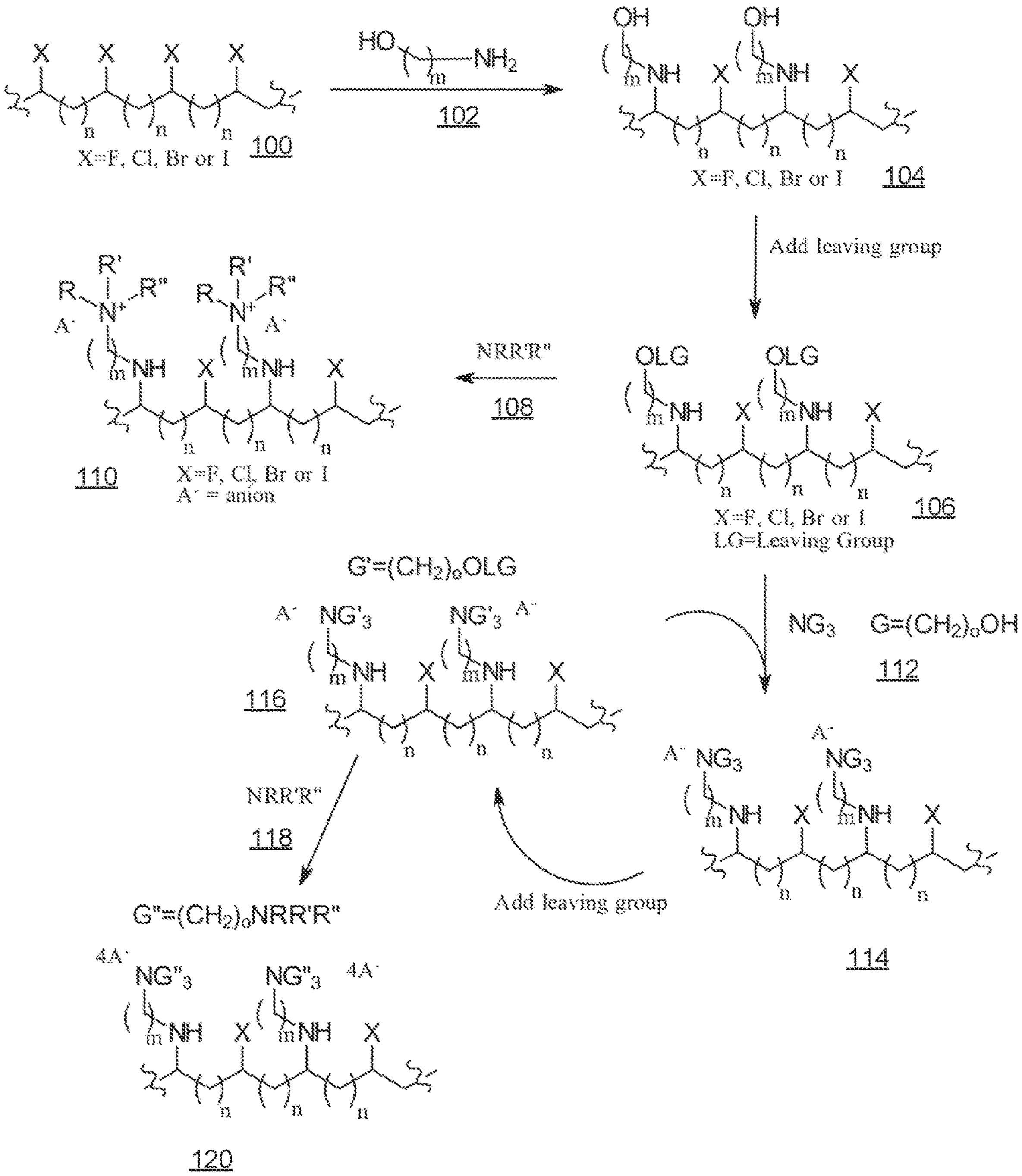
X=F, Cl, Br or I
100
102
Add leaving group
104
X=F, Cl, Br or I
NRR'R"
108
110
X=F, Cl, Br or I
A⁻ = anion
106
X=F, Cl, Br or I
LG=Leaving Group
G'=(CH2)oOLG
116
NG3
G=(CH2)oOH
112
NRR'R"
118
Add leaving group
114
G"=(CH2)oNRR'R"
120

METHOD FOR PRODUCING A PLASTIC OBJECT WITH EMBEDDED QUATERNARY SALTS

CROSS-REFERENCE TO RELATED APPLICATIONS

This application claims priority to and is a continuation-in-part of U.S. patent application Ser. No. 17/419,084 (filed Jun. 28, 2021) which is a 371 filing of International Patent Application PCT/US2019/068568 (filed Dec. 26, 2019) which claims priority to U.S. Provisional Patent Application 62/784,919 (filed Dec. 26, 2018), the entirety of which is incorporated herein by reference.

BACKGROUND OF THE INVENTION

The subject matter disclosed herein relates to commercial products with antibacterial and other antimicrobial (e.g. antifungal or antiviral) properties. Antibacterial agents are widely used in today's society. For example, antibacterial soap, shampoo, wipes and gels are commonly available. Unfortunately, not all commercial products can be easily rendered antimicrobial. Additional methods for producing antibacterial commercial products are therefore desired.

Many approaches have been developed for rendering a variety of environmentally generated surfaces (paper, wood, cotton) antimicrobial. Some approaches have applied coatings to a variety of surfaces (that can be removed from the surface by external means). However, no single solution has been found to be entirely satisfactory. An improved methodology is therefore desired.

The discussion above is merely provided for general background information and is not intended to be used as an aid in determining the scope of the claimed subject matter.

SUMMARY

A method for producing customized object is provided. A resin (e.g. plastic or cellulose) is heated and a quaternary salt is added. The resulting admixture is used in forming a material that embodies customized characteristics. In another embodiment, a halogen-containing polymer has a quaternary molecule covalently bonded to it that results in customized properties.

In a first embodiment, a method of producing a plastic object is provided. The method comprising steps of: heating a plastic admixture until the plastic admixture melts, thereby producing a heated admixture, the plastic admixture comprising a plastic and a quaternary salt; and forming the plastic object from the heated admixture.

In a second embodiment, a method of producing a plastic object is provided. The method comprising sequential steps of: heating an organic solvent that comprises a halogen-containing polymer and an aliphatic amino alcohol of general formula $HO(CH_2)_mNH_2$ where m is an integer from 1-10, thereby producing a first polymer with first hydroxyl groups; transforming the first hydroxyl groups to leaving groups; adding an amine under conditions that displace the leaving groups and covalently link the amine to the halogen-containing polymer, thereby producing a halogen-containing polymer with quaternary ammonium salts covalently linked thereto; heating a plastic admixture until the plastic admixture melts, thereby producing a heated admixture, the plastic admixture comprising the halogen-containing polymer with quaternary ammonium salts covalently linked thereto and a second quaternary salt; and producing the plastic object from the heated admixture.

In a third embodiment, a plastic composition is provided. The plastic composition comprising a halogen-containing plastic covalently bound to a sidechain, wherein the sidechain has a structure of:

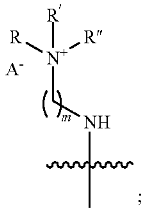

;

wherein m is an integer from 1-10, and R, R' and R" are independently selected alkyl, alkenyl or alkynyl groups, provided R has at least ten carbons but twenty-two or fewer carbons and R' and R" both have at least one carbon but twenty-two or fewer carbons, and $A^-$ is an anion.

In a fourth embodiment, a plastic composition is provided. The plastic composition comprising a halogen-containing plastic covalently bound to a sidechain, wherein the sidechain has a structure of:

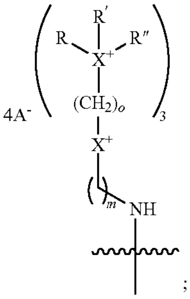

;

wherein m is an integer from 1-10, O is an integer from 1-10; $X^+$ is a quaternary atom selected from a group consisting of nitrogen and phosphorous, wherein and R, R' and R" are independently selected alkyl, alkenyl or alkynyl groups, provided each has at least one carbon but twenty-two or fewer carbons, and $A^-$ is an anion.

In a fifth embodiment, a method of producing a cellulosic object is provided. The method comprising: heating a cellulosic admixture until the cellulosic admixture melts, thereby producing a heated admixture, wherein the cellulosic admixture comprises a cellulosic material and a quaternary salt; mixing the melted cellulosic material and the quaternary salt to produce an admixture; forming the cellulosic object from the heated admixture.

This brief description of the invention is intended only to provide an overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 1 is a synthetic scheme showing methods of incorporation of amines in a polymer resulting in a polymer containing one or more quaternary ammonium moieties.

DETAILED DESCRIPTION OF THE INVENTION

There is limited technology for adding or infusing quaternary salts (e.g. quaternary ammonium salts (QAs), or quaternary phosphonium salts (QPs), directly into materials such as plastic and cellulosic material. This disclosure provides a method for the production of such materials through processes such as, but not limited to, molding, printing, sintering, and welding. In some embodiments, the resulting materials have an antimicrobial agent within their bulk rather than just at their surfaces. The disclosed methods provide infused materials that enable companies and consumers the ability to produce antimicrobial products without need for secondary chemical treatments to add quaternary salts and other biocides to their surfaces.

In one embodiment, quaternary salt-infused materials are produced for use in two-dimensional (2D) or three-dimensional (3D) printers that enable individuals to produce a wide variety of items for their needs. In one embodiment, a pre-existing resin is melted, infused with a quaternary salt, and then solidified to result in an admixture. The admixture is then suitable for use in a printer. In another embodiment, the materials are infused with a quaternary salt to produce the admixture in situ. In such an embodiment, the printer comprises a first chamber containing at least one quaternary salt and a second chamber containing the resin to be used to create the desired item. During printing, the resin and the quaternary salt are moved from each chamber at a predetermined rate and mixed to form the admixture immediately prior to printing. The relative rates of removal from each chamber controls the concentration of the quaternary salt in the final product.

In the process of utilizing heat and pressure, such as a screw extruder, to create plastic and cellulose admixtures care must be taken to enable safe and effective manufacturing methods. One should be careful to avoid combustion and production of volatiles which can result in an unsafe operation and manufacturing defects and undesirable product characteristics including, but not limited to, presence of voids, etching, inconsistent density, strength, and color properties. Excess volatile production may also decrease process efficiency require advanced processing techniques such as use of two-stage extruders with vent ports that while removing volatiles are also prone costly partial loss of the admixture. These issues can be challenging with incorporation of additives—especially additives that are in solution form and prone to volatilization or combustion under manufacturing conditions. In one embodiment, to avoid the aforementioned problems, the quaternary salt is added to the plastic admixture as a solid powder. In another embodiment, the quaternary salt is added to the plastic admixture as a solute in a solvent. Suitable solvents include water, organic alcohols and a combination thereof. Suitable organic alcohols include methanol, ethanol, n-propanol and isopropanol. Part of the art in creation of antimicrobial plastics and cellulose admixtures via heat (and potentially with extrusion) is selection of plastics, celluloses, and quaternary biocides and the nature of the form (solution or powder) such that the admixture melts at temperatures below the flash point of the solvent (e.g. the organic alcohol) and limits adverse production and proper handling of volatiles. Removal of solvents such as alcohols or water, gases, or other unwanted volatile components from a polymer melt can be achieved through employing devolatilization processing methods. These often include strategically locating vents and/or vacuum zones within advanced screw extruder systems.

The resulting plastic object may take any of a variety of forms. In one embodiment, the plastic object is a planar sheet that may subsequently be modified (e.g. folded, bent, etc.) into a predetermined shape and/or object. In another embodiment, the plastic object is formed into a tubular object with a hollow interior.

In addition to greater ease in formation, the resulting materials may exhibit further benefits in terms of durability, less hydrophobicity (i.e. greater wettability), and performance of antimicrobial properties, especially in instances where the materials are being worn or ablated. Generation of filaments infused with quaternary salts or the in situ infusion of quaternary salts into materials within a 3D printer can be especially attractive in medical applications where custom, sterile, rapid, and distributed production might be needed such as in hospital or clinic sites. Alternatively, the materials are formed from the admixture using conventional molding or sintering methods, rather than printing.

A variety of materials are suitable for use with the disclosed processes. These materials include plastics such as, but not limited to, polyethylene terephthalate (or other polyesters) (e.g. PETE or PET), high-density polyethylene (HDPE), polyvinyl chloride (PVC), polyvinylidene chloride (PVDC), polyvinylidene fluoride (PVF, such as TEDLAR®), polyvinylidene difluoride (PVDF, such as KYNAR®), low-density polyethylene (LDPE), polypropylene (PP), polystyrene (PS, such as that sold under the trademark STYROFOAM®), acrylonitrile butadiene styrene (ABS), polycarbonate (PC), polylactic acid (or polylactide) (PLA), poly(methyl 2-methylpropenoate) (or acrylic) (PMMA), acetal (or polyoxymethylene, POM), styrene, and fiberglass. Suitable plastics include types of fluoropolymers such that polytetrafluoroethylene (PTFE) sold under the trademark TEFLON®, fluorinated ethylene propylene copolymers (FEP), perfluoroalkoxy alkanes (PFA), and copolymers of ethylene and tetrafluoroethylene (ETFE). Plastics such as polypropylene, polyvinyl chloride, and high-density polyethylene are commonly produced as powders or granules which then can be melted and injected into molds, drawn into filaments or mixed with other chemicals such as fillers and plasticizers and similarly used.

Further examples of suitable materials include cellulose and cellulose-derivative materials (cellulose esters and cellulose ethers) such as, but not limited to, cellulose acetate, cellulose acetate propionate, cellulose acetate butyrate, nitrocellulose, carboxymethyl cellulose, methyl cellulose, ethyl cellulose, hydroxyethyl cellulose, hydroxypropyl cellulose, hydroxypropyl methylcellulose, and other synthetic cellulose fibers such as LYOCELL®, microcrystalline cellulose, nanocelluloses, cellulose nanofibrils and cellulose nanocrystals.

A single quaternary salt or a mixture of different quaternary salts may be used to form the admixture. A variety of ammonium quaternary salts that are stable at temperatures commonly employed during 3D printing include a variety of compounds or salts thereof, including alkyldimethylbenzylammonium chloride (ADBAC) or its other salts, where alkyl is a saturated carbon chain of C-2 to C-22. Further examples include benzethonium chloride (or hyamine), methylbenzethonium chloride, cetalkonium chloride, cetylpyridinium chloride, cetrimonium, cetrimide, dofanium chloride, tetraethylammonium bromide, didecyldimethylammonium chloride (DDAC), dimethyldioctadecylammonium chloride and domiphen bromide. Trimethylalkylammonium salts may also be used where alkyl is a saturated carbon chain of C-2 to C-22.

The quaternary salt may also be a quaternary phosphonium (QP) salt. These include, but are not limited to, trimethylalkylphosphonium chloride, benzyldimethylalkylphosphonium chlorides, and benzyltrialkylphosphonium chlorides (where the alkyl portion is a linear hydrocarbon chain with C-2 to C-22 chains).

Broad examples of potential applications exist where materials would benefit from being infused with quaternary salts. Specific examples include components of heat exchangers, high-active surface area plastic media for air stripping towers, filter media (e.g. filter sheets, filter membranes including those polyvinylidene difluoride (PVDF) filter membranes sold under the brand name KYNAR®) and housings, medical devices such as tubing, bioprinting, prosthetics, hospital surfaces, handling and storage, and even toys. Other applications include uses in food and beverage preparation, handling and storage. In some embodiments, the resulting plastic is useful as an anion exchange resin.

Referring to FIG. 1, in one embodiment, a halogen-containing polymer 100 is covalently bonded to a quaternary salt. Suitable halogen-containing plastics include polyvinyl chloride (PVC), polyvinylidene fluoride and polyvinylidene difluoride (PVDF). The polymer 100 may be placed in an organic solvent to form a mixture. Suitable solvents include tetrahydrofuran (THF) where the polymer 100 may be relatively soluble or acetonitrile where the polymer 100 is relatively insoluble. An aliphatic amino alcohol 102 (e.g. 2-aminoethanol) of the general formula $HO(CH_2)_mNH_2$ is added and the mixture is brought to reflux for a prolonged period of time (e.g. 8 hours to 142 hours). For instance, 72 hours at 42° C. is sufficient for 2-aminoethanol. In the general formula, m is an integer from 1 to 10. In one embodiment, the amino alcohol is both a primary amine and a primary alcohol.

For example, when the polymer 100 is PVC and a repeating unit of $C_2H_3Cl$ (molar mass 62.50 g/mol) one can assume 62.5 g provides one mole of chlorine atoms. In such an example between 0.5 and 1.0 moles of the aliphatic amino alcohol 102 should be used for every 62.5 gram of the polymer 100. This means between 0.5 and 1.0 moles of the aliphatic amino alcohol 102 is used for every 1 mole of halogen in the polymer 100.

At the end of this time, the resultant modified polymer 104 can be collected by solvent evaporation (such as with THF) or through suction filtration (as can be done with acetonitrile). Subsequently, the modified polymer 104 can be washed with water and air-dried to remove residues. The modified polymer 104 is then functionalized to transform the hydroxyl groups into leaving groups and thereby produce the activated polymer 106. Suitable leaving groups include sulfonates such as tosylate, triflate, mesylate, sulfurylate, brosyl, and imidazole-1-sulfonate. Other leaving groups may include use of chlorosulfite, phosphite ester benzoates, chlorine and the like. The activated polymer 106 is collected by suction filtration and washed with cold water.

In one embodiment, the activated polymer 106 is treated with an amine 108. In one embodiment, the amine 108 is a tertiary amine that has a general formulation NRR'R" wherein R, R', and R" represent alkyl (or alkenyl or alkynyl) groups with from one to twenty-two carbons. In another embodiment, the amine 108 is a secondary amine that has a general formulation NRR'H. In another embodiment, a tertiary phosphine may be used that has a general formulation of PRR'R".

For applications where this material as produced has antimicrobial properties at least one of R, R' and R" is of the size between ten and twenty-two carbon atoms and the other two are of a size between one and twenty-two carbon atoms. R, R' and R" may all be the same, or may be three different groups, as long as at least one of them is of size between ten and twenty-two carbon atoms. For applications where additional modification is desired or where anion exchange is an objective, a mixture of tertiary amines may be used where some of them are structured such that R, R' and R" are one to twenty-two carbon atoms in length. After being allowed to react for one day, the modified polymer product 110 is isolated by suction filtration and washed with cold water and air-dried to purify. This material constitutes a synthetic antimicrobial and/or anionic exchange polymeric material and may be used as is or melted and formed into desired shapes through injection molding or other methods as may be appropriate for the intended shape.

For further branching of the pendant groups on the main polymer backbone chain, the activated polymer 106 may be treated with an amino alcohol 112. In one embodiment, the amino alcohol 112 is a tertiary amino alcohol and has a general formula $N((CH_2)_o)OH)_3$ wherein O is an integer from 1 to 10 and where each alky chain independently selects a value of O such that each alkyl chain may have a different O value. The modified polymer 114 may be isolated as previously described. In other embodiment, a phosphino alcohol is used and a quaternary phosphonium salt is produced.

The modified polymer 114 is then functionalized to transform the hydroxyl groups to leaving groups and thereby produce an activated polymer 116. Suitable leaving groups include, but are not limited to, sulfonates such as tosylates, triflates, benzoates, chlorine and the like. The activated polymer 116 is then collected by suction filtration and washed with cold water and again air-dried.

In some embodiments, the activated polymer 116 is again treated with a tertiary amino alcohol (which may be the same or different than tertiary amino alcohol 112) to produce a further modified polymer 114. Such an embodiment enables extensive branching of the resulting polymer.

Regardless of the number of cycles of treatment with a tertiary amino alcohol, subsequent treatment of the activated polymer 116 with a tertiary amine 118 of the general formulation NRR'R" yields modified polymer product 120.

The exact synthetic step varies depending on the nature of the functional group. For example, when the leaving group is a tosylate the treatment with the tertiary amine 118 may include adding a base such as sodium bicarbonate.

Example 1—PVC Pellet—One Cycle

Rigid high purity PVC without fillers or plasticizers PVC with a number-average molecular weight ($M_n$) of ~55,000 in the form of microporous clear plastic resin pellets (oblate spheroidal in shape equatorial radius 4 mm and polar radius 3 mm) in a total mass of 93.8 g (~1.5 mole assuming a $C_2H_3Cl$ repeating unit of 62.50 g/mol)) was modified by reaction with 15.3 g (0.25 mole) of 2-aminoethanol (monoethanolamine) in 400 mL acetonitrile solution heated to 42° C. for a period of 3 days. While the pellets may have a porosity of 0.25, during this preparation it is assumed that reactions are primarily limited to 60% of the pellet and only 5% of the chloride are displaced. As a result, it is expected that 3% of the chlorides in the PVC will be displaced by the amino alcohol from the pellets. After this time, the resultant modified polymer is collected by suction filtration through sintered glass and washed with water (3 L) and dried in air. This modified polymer is then placed in a 2 L flask with an aqueous medium (400 mL) containing sodium bicarbonate (10.1 g (0.12 mole)) and p-toluenesulfonyl chloride (22.9 g (0.12 mole)) and agitated for one day. After this time, the further modified polymer is collected by suction filtration through sintered glass and washed with cold water (2 L) then returned to an aqueous medium (675 mL in a 2 L flask) containing the tertiary amine trioctadecylamine (92.9 g (0.12 mole)), and agitated for four days without heating. After this time, the modified polymer is collected by suction filtration through sintered glass and washed with water (2 L) to remove residuals and the modified solid polymer was air dried. The general formula of the derivatized PVC would be:

$$C_2H_3Cl_{1-i}[NHRN^1[R^1]_3]_i$$

where I is the fraction of displaced chlorides on PVC (estimated at 3%), R is a two-carbon alkane, $R^1$ is an 18-carbon alkane and $N^1$ is a quaternarized nitrogen, but N is not.

Example 2—PVC Pellet—Two Cycles

A similar amount of porous rigid PVC pellets as detailed in example 1 are treated with the same amount of 2-aminoethanol and tosylated in the same manner then washed and dried. The modified PVC (106) is then returned to an aqueous medium (375 mL) in a 2 L flask containing triethanolamine (17.9 g (0.12 mole)), and agitated for one day at ambient temperature. The further modified polymer is then collected by suction filtration through sintered glass and returned to an aqueous solution (500 mL) in a 2 L flask containing again sodium bicarbonate (22.7 g (0.27 mole)) and p-toluenesulfonyl chloride (51.5 g (0.27 mole)) and is agitated for one day at ambient temperature. The resulting tosylated polymer is collected by suction filtration through sintered glass and washed with cold water (2 L) and air dried. The tosylated polymer is subjected to further branching of the pendant groups on the main polymer backbone chain where dodecyldimethylamine (115.2 g (0.54 mole)) in water (650 mL in a 2 L flask). The modified polymer is then isolated by suction filtration through sintered glass and washed with water (2 L) and air dried. This material constitutes a synthetic antimicrobial polymeric material that also includes numerous anion exchange sites and may be used as is or melted and formed into desired shape by injection molding or other method as may be appropriate for producing the desired shape of the polymeric material.

Example 3—PVC Pellet—Three Cycles

The same mass of rigid high purity PVC without fillers or plasticizers PVC as shown in examples 1 and 2, but in the form of solid non-porous pellets of the same overall dimensions is subject to modification. It is estimated that chlorides will only be substituted near the surface and as a result 0.3% of the total chlorides in the PVC can be displaced by the amino alcohol from the pellets. The pellets can then be subjected to the same treatment as above with the same mass of PVC and 30% of the solvents, but with 10% of the reactants. The tosylated polymer is subjected to further branching of the pendant groups on the main polymer backbone chain where triethanolamine (8.06 g (0.054 mole)) in water (400 mL in a 2 L flask). The modified polymer is then isolated by suction filtration through sintered glass and washed with water (2 L) and air dried. This material is then placed in an aqueous medium (450 mL in a 2 L flask) containing sodium bicarbonate (23.8 g (0.28 mol)) and p-toluenesulfonyl chloride (46.34 g (0.24 mole)) and agitated for one day at ambient temperature. After this time, the further modified polymer is collected by suction filtration through sintered glass and washed with cold water (2 L) and air dried. For generation of the lipophilic quaternary ammonium sites, the modified polymer is then treated with 51.85 g (0.24 moles) of dodecyldimethylamine with 550 ml of water. After being allowed to react for one day, the modified polymer product was isolated by suction filtration through sintered glass and washed with cold water (2 L) and then air-dried. This material constitutes a synthetic antimicrobial polymeric material that also includes numerous anion exchange sites and may be used as is or melted and formed into desired shape by injection molding or other method as may be appropriate for producing the desired shape of the polymeric material.

Example 4—PVC Powder—Two Cycles

As a prophetic example, 62.5 g (which equates to 1 moles assuming a $C_2H_3Cl$ repeating unit of 62.50 g/mol) of polyvinyl chloride (PVC) with a number-average molecular weight ($M_n$) of 80,000 in powder form is treated with monoethanolamine (30.6 g (0.5 moles)) in an acetonitrile medium (300 mL) at 42° C. in a reflux reactor for three days. For this example, one assumes that approximately 5% of the chlorides in the PVC are lost from the powder. The material is then washed with cold water and placed in aqueous medium (320 mL) containing an excess of sodium bicarbonate (16.8 g (0.2 moles)) and p-toluenesulfonyl chloride (38.13 g (0.2 moles)). The mixture is agitated for two days. The material is washed with cold water and placed in aqueous medium (275 mL) containing triethanolamine (29.8 g (0.2 moles) which equates to a 4 to 1 molar ratio with the tosylated-monoethanolamine given the assumed level of PVC modification. After one day, the modified material is washed with cold water and treated for a second round of tosylation where the three hydroxyl groups on the triethanolamine are targeted. Again in aqueous medium (575 ml of water), with sodium bicarbonate (37.8 g (0.45 moles)) and a p-toluenesulfonyl chloride (85.8 g (0.45 moles)) are being added. These are approximately a 3 to 1 molar ratio to the hydroxyl groups on the triethanolamine given again the original level of suspected PVC substitution. After two days, the material is washed with cold water and placed in aqueous medium (400 mL) containing dimethylhexadecylamine (121.3 g (0.45 moles)). Assuming complete tosylation in the previous reaction, this amount of dimethylhexadecylamine equates to an approximate molar ratio of 3 to 1 tosyl groups on the triethanolamine. After being allowed to react for one day, the modified polymer object is washed with cold water and then air-dried. The resultant material is permanently antimicrobial and has potential utility as an anion exchange resin. The general formula of the derivatized PVC would be:

$$C_2H_3Cl_{1-i}[NHRN^1[R^1N^2R^2R^3R^4]_3]_i$$

where I is the fraction of displaced chlorides on PVC, R and $R^1$ would be two-carbon alkanes, $R^2$ and $R^3$ are methyl groups and $R^4$ is a sixteen-carbon alkane and $N^1$ and the three $N^2$ are quaternarized nitrogens, but N is not.

Example 5—PVC—Two Cycles with Use of Thionyl Chloride Instead of p-Toluenesulfonyl Chloride The same polyvinyl chloride powder solid as is mentioned in example 5 (62.5 g) is treated with monoethanolamine (30.6 g (0.5 moles)) in an acetonitrile medium (300 mL) at 42° C. in a reflux reactor for three days. For this example, once again assumes that approximately 5% of the chlorides in the PVC are lost from the powder. The modified polymer is then washed with cold water and placed in an acetonitrile medium (300 mL) and thionyl chloride (23.8 g (0.2 moles)) was added and the mixture agitated for one day at ambient temperature. After this time the further modified polymer was treated with an excess (100 mL) of 100% ethanol in a suitable fume hood and the remaining solid was collected by suction filtration through sintered glass and washed with cold ethanol (200 mL) before returning it to an aqueous medium (375 mL-2 L flask)) containing triethanolamine (29.8 g (0.2 moles)), and agitated for one day at ambient temperature. At the end of this time, the further modified polymer was collected by suction filtration through sintered glass and returned to an acetonitrile solution (400 mL) in a 2 L flask containing thionyl chloride (35.7 g (0.3 moles)) and agitated for one day at ambient temperature. After this time 100% ethanol 100 mL was added in a suitable fume hood and the further modified polymer was collected by suction filtration through sintered glass and washed with cold water (2 L). For introduction of the lipophilic quaternary ammonium sites, the modified polymer was then treated with dimethylhexadecylamine (80.9 g (0.3 moles)) in acetonitrile solution (550 mL-2 L flask) and allowed to react for one day. After this time the modified polymer product was isolated by suction filtration through sintered glass and washed with cold water (2 L) and then dried in air. This material constitutes an antimicrobial anthropogenic polymeric material and may be melted and formed into desired shape by injection molding or other method as may be appropriate for producing the desired shape of the polymeric material.

Example 6 PVC Pellet—Two Cycles with Phosphonium

The same formulation as detailed in EXAMPLE 2 except 14.9 g (0.12 mole) of tris(hydroxymethyl)phosphine or 25.0 g (0.12 mole) of tris(hydroxypropyl)phosphine is used instead of 17.9 g (0.12 mole) of triethanolamine. As another example of tertiary phosphine being employed instead of a tertiary amine, 124.4 g (0.54 mole)) dodecyldimethylphosphine can be used instead of dodecyldimethylamine in EXAMPLE 2. As the nitrogens are quaternized when they displace the tosylate leaving groups in these reactions, the phosphorous in these tertiary phosphines are quaternized and becomes phosphonium ions.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method of producing a plastic object, the method comprising steps of:

heating a plastic admixture until the plastic admixture melts, thereby producing a heated admixture, the plastic admixture comprising a plastic and a quaternary phosphonium (QP) salt; and forming the plastic object from the heated admixture, wherein the plastic object is a heat exchanger.

2. A method of producing a plastic object, the method comprising steps of:

heating a plastic admixture until the plastic admixture melts, thereby producing a heated admixture, the plastic admixture comprising a plastic and a phosphonium (QP) quaternary salt; and forming the plastic object from the heated admixture, wherein the plastic object is a filter media.

3. A method of producing a plastic object, the method comprising steps of:

heating a plastic admixture until the plastic admixture melts, thereby producing a heated admixture, the plastic admixture comprising a plastic and a quaternary salt; and forming the plastic object from the heated admixture, wherein the step of forming of the plastic object from the admixture uses a printer.

4. The method as recited in claim 3, wherein the quaternary salt is a quaternary phosphonium (QP) salt.

5. The method as recited in claim 3, wherein the plastic object is a heat exchanger.

6. The method as recited in claim 3, wherein the plastic object is a filter media.

7. The method as recited in claim 3, wherein the quaternary salt is added to the plastic admixture as a solid powder.

8. The method as recited in claim 3, wherein the quaternary salt is added to the plastic admixture as a solute in a solvent selected from the group consisting of water, an organic alcohol and a combination thereof.

9. The method as recited in claim 3, wherein the quaternary salt is selected from a group consisting of an alkyldimethylbenzylammonium chloride (ADBAC), an ADBAC salt, a benzethonium salt, a methylbenzethonium salt, a cetalkonium salt, a cetylpyridinium salt, a cetrimonium salt, cetrimide, a dofanium salt, a tetraethylammonium salt, didecyldimethylammonium chloride (DDAC), a dimethyldioctadecylammonium salt, a domiphen salt, and a trimethylalkylammonium salt.

10. The method as recited in claim 3, wherein the quaternary salt is a quaternary ammonium (QA) salt.

11. The method as recited in claim 10, wherein the plastic object is a heat exchanger.

12. The method as recited in claim 10, wherein the plastic object is a filter media.

13. The method as recited in claim 10, wherein the quaternary salt is added to the plastic admixture as a solid powder.

14. The method as recited in claim 10, wherein the quaternary salt is added to the plastic admixture as a solute in a solvent selected from the group consisting of water, an organic alcohol and a combination thereof.

15. The method as recited in claim 10 wherein the quaternary salt is selected from a group consisting of an alkyldimethylbenzylammonium chloride (ADBAC), an ADBAC salt, a benzethonium salt, a methylbenzethonium salt, a cetalkonium salt, a cetylpyridinium salt, a cetrimonium salt, cetrimide, a dofanium salt, a tetraethylammonium salt, didecyldimethylammonium chloride (DDAC), a dimethyldioctadecylammonium salt, a domiphen salt, and a trimethylalkylammonium salt.

16. A method of producing a plastic object, the method comprising steps of:

heating a plastic admixture until the plastic admixture melts, thereby producing a heated admixture, the plastic admixture comprising a plastic and a quaternary salt; and forming the plastic object from the heated admixture, wherein the quaternary salt is selected from a group consisting of a trimethylalkylphosphonium salt, a benzyldimethylalkylphosphonium salt and a benzyltrialkylphosphonium salt.

17. A method of producing a plastic object, the method comprising sequential steps of:

heating an organic solvent that comprises a halogen-containing polymer and an aliphatic amino alcohol of general formula $HO(CH_2)_mNH_2$ where m is an integer from 1-10, thereby producing a first polymer with first hydroxyl groups;

transforming the first hydroxyl groups to leaving groups;

adding an amine under conditions that displace the leaving groups and covalently link the amine to the halogen-containing polymer, thereby producing a halogen-containing polymer with quaternary ammonium salts covalently linked thereto;

heating a plastic admixture until the plastic admixture melts, thereby producing a heated admixture, the plastic admixture comprising the halogen-containing polymer with quaternary ammonium salts covalently linked thereto and a second quaternary salt; and producing the plastic object from the heated admixture.

18. The method as recited in claim 17, wherein the second quaternary salt is a quaternary ammonium (QA) salt.

19. The method as recited in claim 17, wherein the second quaternary salt is a quaternary phosphonium (QP) salt.

20. The method as recited in claim 19, wherein the plastic object is a heat exchanger or a filter media.

* * * * *